(12) United States Patent
Polyakov (10) Patent No.: US 9,886,523 B2
(45) Date of Patent: Feb. 6, 2018

(54) INTELLIGENT SEARCH AND SERVICE CUSTOMIZATION

(71) Applicant: DELONACO LIMITED, Nicosia (CY)

(72) Inventor: Maxym Polyakov, Menlo Park, CA (US)

(73) Assignee: DELONACO LIMITED, Nicosia (CY)

( * ) Notice: Subject to any disclaimer, the term of this patent is extended or adjusted under 35 U.S.C. 154(b) by 0 days.

(21) Appl. No.: 14/027,455

(22) Filed: Sep. 16, 2013

(65) Prior Publication Data
US 2015/0081665 A1   Mar. 19, 2015

(51) Int. Cl.
*G06F 17/30* (2006.01)

(52) U.S. Cl.
CPC .............. *G06F 17/30964* (2013.01)

(58) Field of Classification Search
None
See application file for complete search history.

(56) References Cited

U.S. PATENT DOCUMENTS

| | | | | |
|---|---|---|---|---|
| 6,847,938 B1* | 1/2005 | Moore | ............... | G06Q 30/0613 705/26.41 |
| 7,836,060 B1* | 11/2010 | Rennison | ............ | G06F 17/30675 707/749 |
| 2005/0222989 A1* | 10/2005 | Haveliwala | ....... | G06F 17/30867 |
| 2009/0164929 A1* | 6/2009 | Chen et al. | .................... | 715/769 |
| 2010/0145976 A1* | 6/2010 | Higgins et al. | .............. | 707/765 |
| 2010/0250578 A1* | 9/2010 | Athsani et al. | ............... | 707/765 |
| 2011/0125739 A1* | 5/2011 | Wexler | .............. | G06F 17/30867 707/734 |
| 2012/0005219 A1* | 1/2012 | Apacible | ............ | G06F 17/30675 707/768 |
| 2014/0280063 A1* | 9/2014 | Sen | ............................... | 707/722 |
| 2014/0280214 A1* | 9/2014 | Han | .................. | G06F 17/30943 707/748 |
| 2014/0358890 A1* | 12/2014 | Chen | ................. | G06F 17/30867 707/710 |
| 2015/0310530 A1* | 10/2015 | Zhang | ................ | G06Q 30/0631 705/26.7 |
| 2016/0034462 A1* | 2/2016 | Brewer | ............ | G06F 17/30958 707/734 |

* cited by examiner

*Primary Examiner* — Sangwoo Ahn
(74) *Attorney, Agent, or Firm* — Georgiy L. Khayet (57) ABSTRACT

An intelligent search and interface customization system including innovative methods of processing user requests and optimizing search results is disclosed.

6 Claims, 7 Drawing Sheets

INTELLIGENT SEARCH AND SERVICE CUSTOMIZATION

TECHNICAL FIELD

The present invention is directed to an optimized search system.

DETAILED DESCRIPTION

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, an intelligent search and interface customization system includes innovative methods of processing user requests, and optimizing search results.

According to certain embodiments, the intelligent search and interface customization provides a good user experience to a user by adjusting to the user's needs such that the user obtains relevant user results without being encumbered by monotonous operations. Such a system can greatly improve customer (user) retention and increase profits for businesses that rely, at least in part, on search systems to sell goods and services, including social media businesses.

Figure 1:
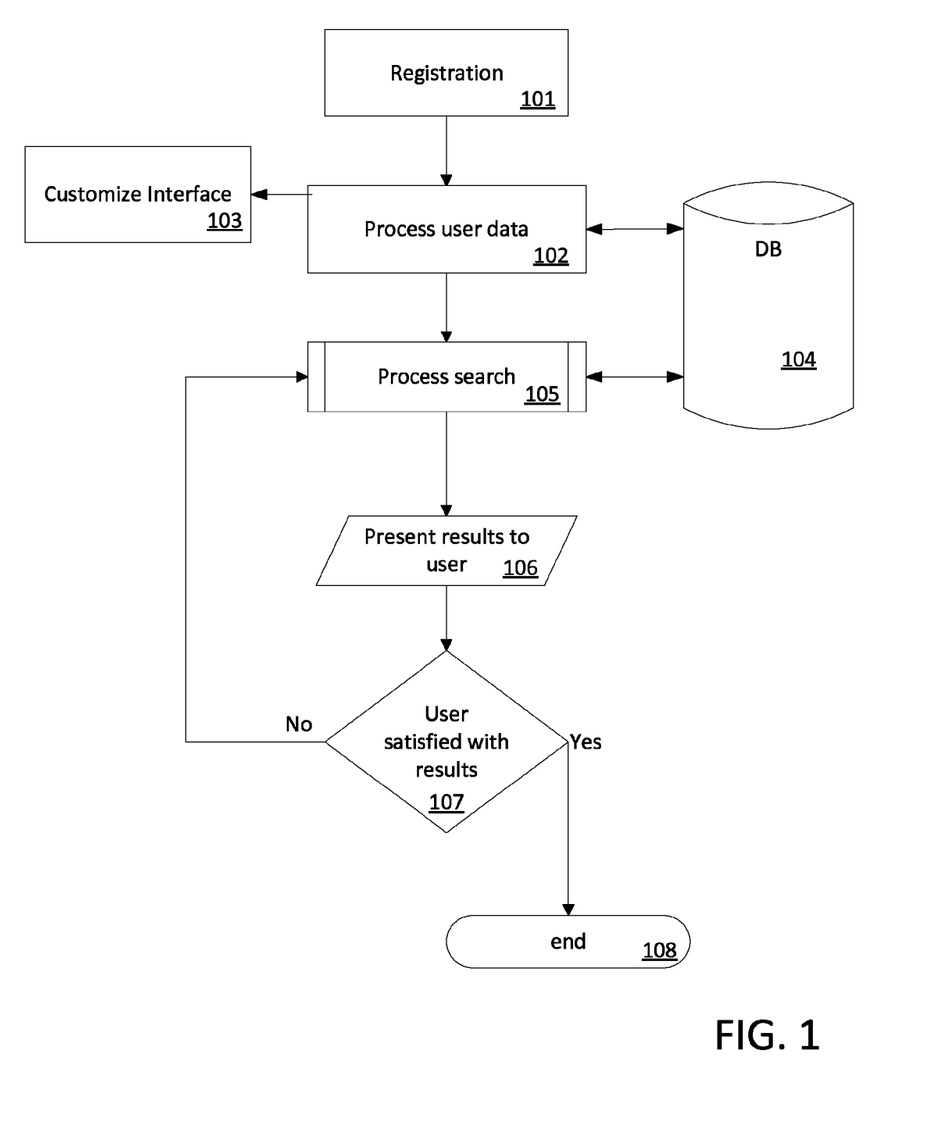
FIG. 1 is a high-level flow chart that illustrates interaction of a search system with a user, according to certain embodiments.

FIG. 1 is a high-level flow chart that illustrates interaction of a search system with a user, according to certain embodiments. At block 101 of FIG. 1, a user registers with a service (or logs in if she is already registered with the service). At block 102, the information associated with the user is processed and stored in database 104. According to certain embodiments, the information associated with the user is organized in database 104 for future analysis. For example, the information associated with the user including user's preferences can be compared to information associated with other users to predict user behavior.

At block 103, the system can optionally customize the user interface for the user, according to certain embodiments. As a non-limiting example, a male-oriented interface can be decorated with sports cars. According to certain embodiments, such an interface is decorated specifically for the user by taking into account information associated with the user.

At block 105, the user's search criteria are processed. According to certain embodiments, the processing of search criteria includes using information associated with the user from database 104.

At block 106, the search results are presented to the user. If at block 107, the user is not satisfied with the search results, the system repeats the search process until the user is satisfied with the search results. If at block 107, the user is satisfied with the search results, then the process ends at block 108.

According to certain embodiments, if a large volume of search results is found during the search process based on the user's search criteria, then the search results are organized so as to present the most relevant results first to the user. In other words, the results are presented in the order of highest relevance to the lowest relevance. On the other hand, according to certain embodiments, if the volume of search results is small (or non-existent), then the search results can be enlarged to include more results with features that satisfy search criteria that are similar to the original search criteria, as described in greater detail herein. Such search processing features is more likely to be successful in producing relevant search results that are of interest to the user.

According to certain embodiments, the system can present results that are of greater interest to the user by using a reverse search (reciprocal search) method, as described in greater detail herein. As a non-limiting example, if a user searches for a location to purchase a car, the system not only takes into account the user's geographical location but also ranks car sellers that prefer to sell cars in the user's location. As another non-limiting example, with respect to a dating site, if a blonde user is searching for a brunette user, the search results can be ranked according to users searching for blonde users.

According to certain embodiments, the system attempts to obtain as much information on the user's preferences with as little user active participation as possible in order not to bother the user. For example, information on the user can be obtained from various sources such as social media sites, email accounts, online retail sites and other user services sites, and stored in databases. Such detailed user information is used not only to improve search results for the user but also can be used to customize the user service interface and presentation of the results to enhance the user's search experience.

Figure 2:
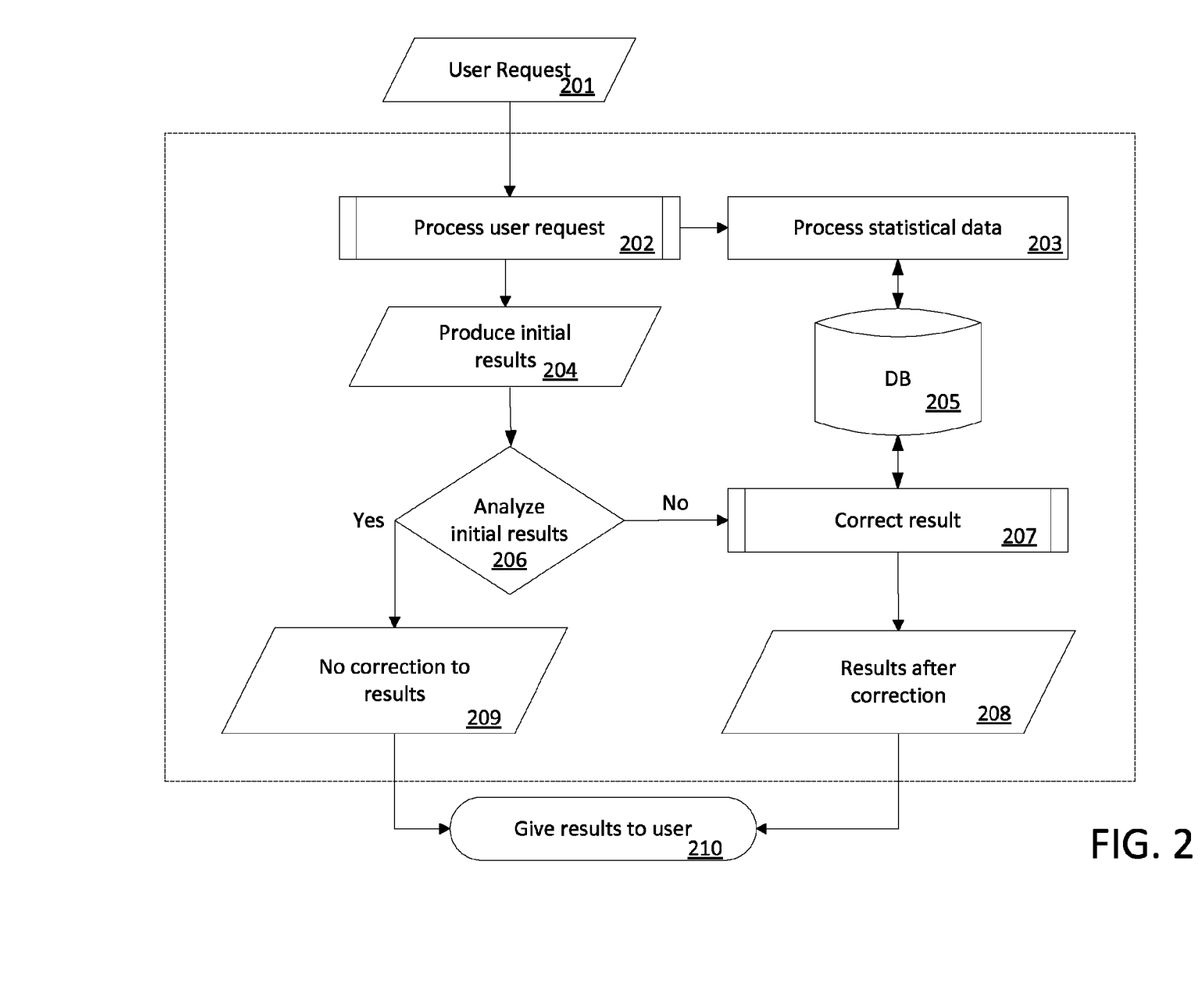
FIG. 2 is a high-level flow chart that illustrates features of a search performance, according to certain embodiments.

FIG. 2 is a high-level flow chart that illustrates features of a search performance, according to certain embodiments. At block 201 of FIG. 2, the user enters a user request. At block 202, the system processes the user request. According to certain embodiments, the processing of the user request may involve modifying or correcting the user request as described in greater detail herein. At block 203, the system processes statistical data associated with the user. Statistical data and other information associated with the user is organized and stored in database 205, according to certain embodiments. Information associated with a user can be used to predict the behavior of the specific user as well the behavior of similar users, according to certain embodiments. The processing of the user request at block 202 may include using data from database 205 to produce initial results at block 204. The initial results from block 204 are analyzed at block 206. If the analysis at block 206 indicates that the initial results meet the criteria of the user's request, then the initial results become the final results at block 209. If the analysis at block 206 indicates that the initial results do not meet the criteria of the user's request, then the initial results are modified or corrected at block 207. The modification/correction of search results is described in greater detail herein. The modified or corrected results become final results at block 208. The final results are presented to the user at block 210.

Figure 3:
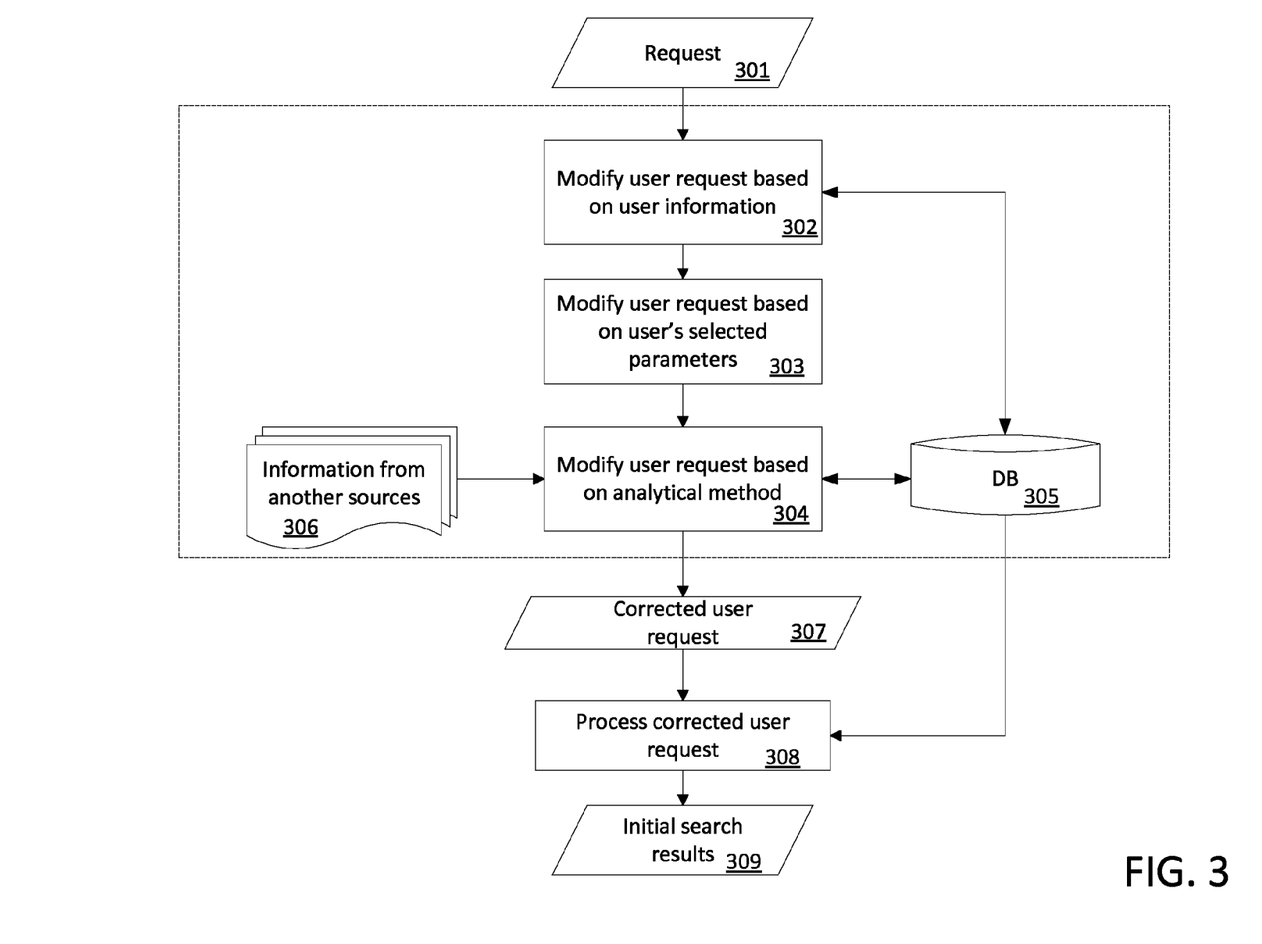
FIG. 3 is a flow chart that illustrates some of the features of processing a user request by the system, according to certain embodiments.

FIG. 3 is a flow chart that illustrates some of the features of processing a user request by the system, according to certain embodiments. According to certain embodiments, some of the steps of processing the user request reduce the computational loads associated with using the database. In FIG. 3, at block 301, the user submits her search request. At block 302, the user's search request is modified or corrected based on information associated with the user. As a non-limiting example, the system modifies or corrects the user's search request based on the user's personal information that can be retrieved from the database 305, according to certain embodiments. Personal user information can include age, gender, residence area code, income, etc. As a non-limiting example, for an online store, sporting goods such as fishing equipment can be shown to men while cosmetics and beauty aids can be offered to women. As another example, for online dating sites for men, search for women can be based on geographical location of the women. At block 303, the search request is further modified/corrected based on the search parameters selected by the user to perform the search. At block 304, the search request is again further modified/corrected using an analytical method that compares information associated with the user retrieved from the database 305 with user information that is retrieved from other sources 306 such as social media networks, consumer data, etc., to produce a final modified/corrected user search request at block 307. At block 308, the system processes the modified/corrected user search request from block 307 using information from database 305 to produce initial search results at block 309. Initial search results are previously described herein with reference to FIG. 2.

Figure 4:
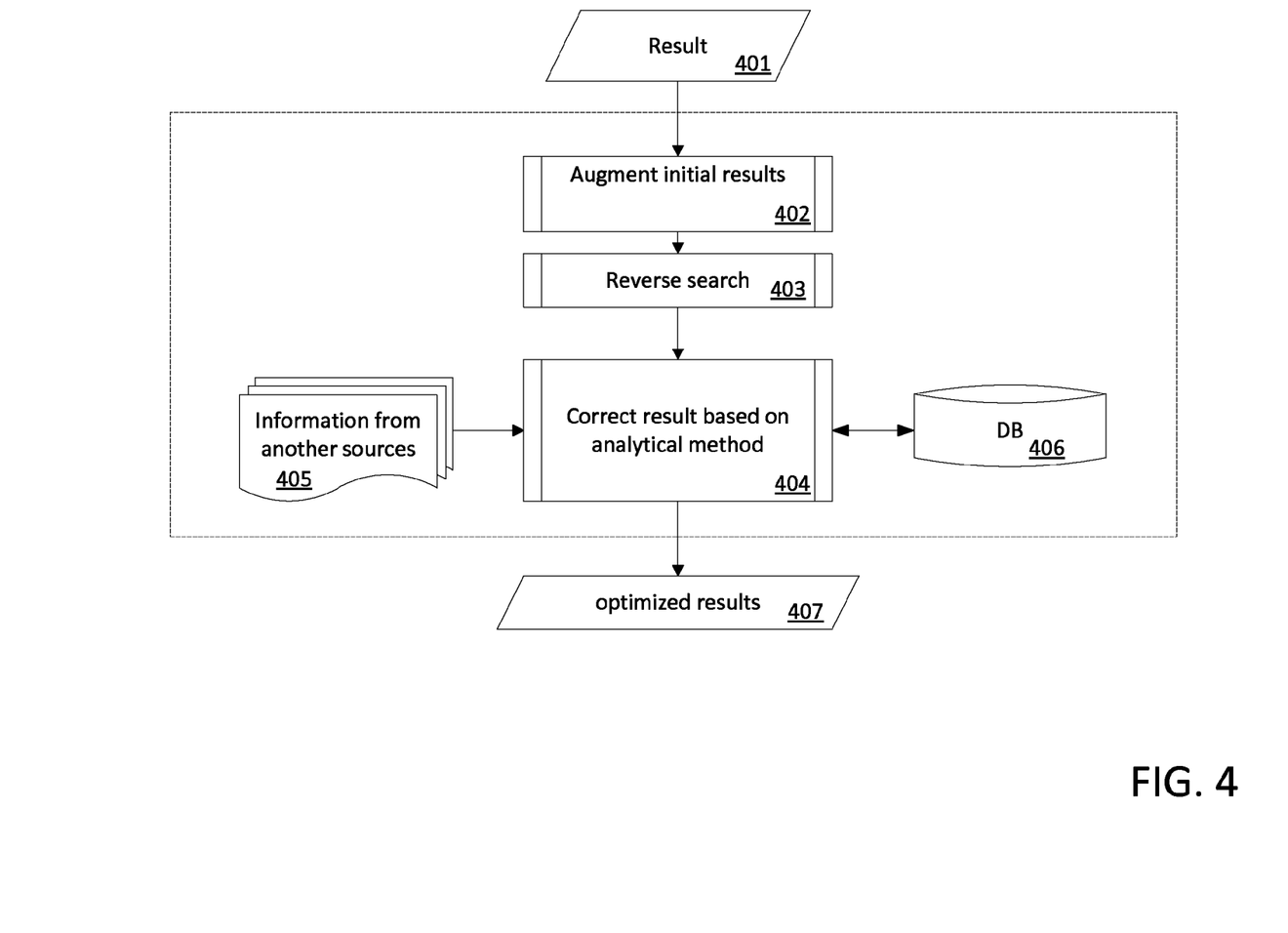
FIG. 4 is a high-level flow chart that illustrates some steps for modifying/correcting search results, according to certain embodiments.

FIG. 4 is a high-level flow chart that illustrates some steps for modifying/correcting search results, according to certain embodiments of the invention. At block 401 in FIG. 4, the system starts to process the initial search results. At block 402, the system augments the initial search results by providing additional search results if the initial search results from block 401 are inadequate (for example, the initial search results are small in number), according to certain embodiments. The augmenting process is described in greater detail herein. At block 403, the system performs a "reverse search". A "reverse search" is a two-way connection search. For example, if a 50 year old male user is looking for blonde women (target users) on an online dating site, the "reverse search" procedure will rank results by first showing blonde women that are seeking 50 year old men to the user. In other words, the search results will not only meet the user's search criteria but also that the user meets the search criteria of the target users (two-way connection search or reciprocal search). The reverse search procedure is described in greater detail herein. At block 404, the system further modifies/corrects the search results by using an analytical module that compares information associated with the user retrieved from the database 406 with user information that is retrieved from other sources 405 such as social media networks, consumer data, etc., to forecast the user's preferences and produce optimized search results at block 407.

Figure 5:
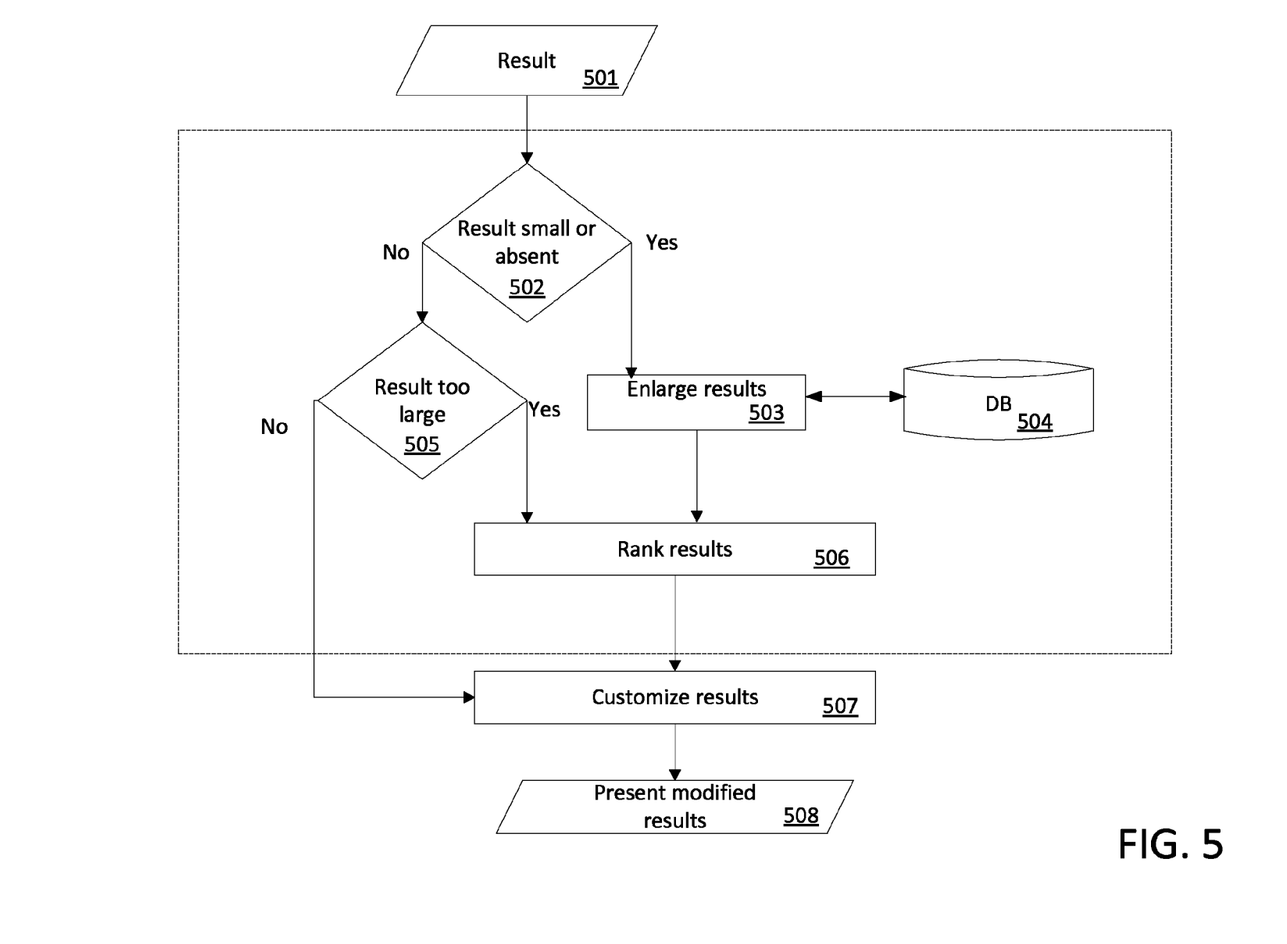
FIG. 5 is a high-level flow chart that illustrates some steps for augmenting search results, according to certain embodiments.

FIG. 5 is a high-level flow chart that illustrates some steps for augmenting search results, according to certain embodiments. Augmenting search results is sometimes needed when the user's search request is too specific or restrictive such that the corresponding set of search results is too small or non-existent. The set of search results can be enlarged by relaxing the search criteria of the user's search request. For example, the user's search request can be made less specific. In FIG. 5, at block 501, the set of search results is sent for processing by the system to determine if the set of search results is too small or is absent at block 502. According to certain embodiments, the system uses quantitative indicators to check the size of the set of search results. If the set of search results is too small or is absent, then the set of search results can be enlarged by relaxing the search criteria at block 503 and communicating with database 504. For purposes of explanation, assume that a user of a dating site is specifies an Asian partner with blue eyes and light colored hair as search criteria. If the database fails to produce any dating partners that fit that particular search criteria, then the system relaxes the search criteria by not specifying any particular eye color so as to produce more search results (for example, Asian dating partners with light hair and any color eyes). If the set search results remain small, then the search criteria can be further relaxed (for example, Asian dating partners with any color hair and any color eyes). Returning no results or a small set of results to the user is undesirable as it might frustrate the user.

If the set of search results is not too small, then at block 505, it is determined if the set of search results is too large. If it is determined that the set of search results is too large, then at block 506, the system ranks the search results so as to present the most relevant results to the user first. After the optimal number of results is obtained and ranked, then at block 507, the search results can be presented to the user using an interface that is customized for that particular user, according to certain embodiments. Customization is described in greater detail herein. The final results are presented to the user at block 508.

Figure 6:
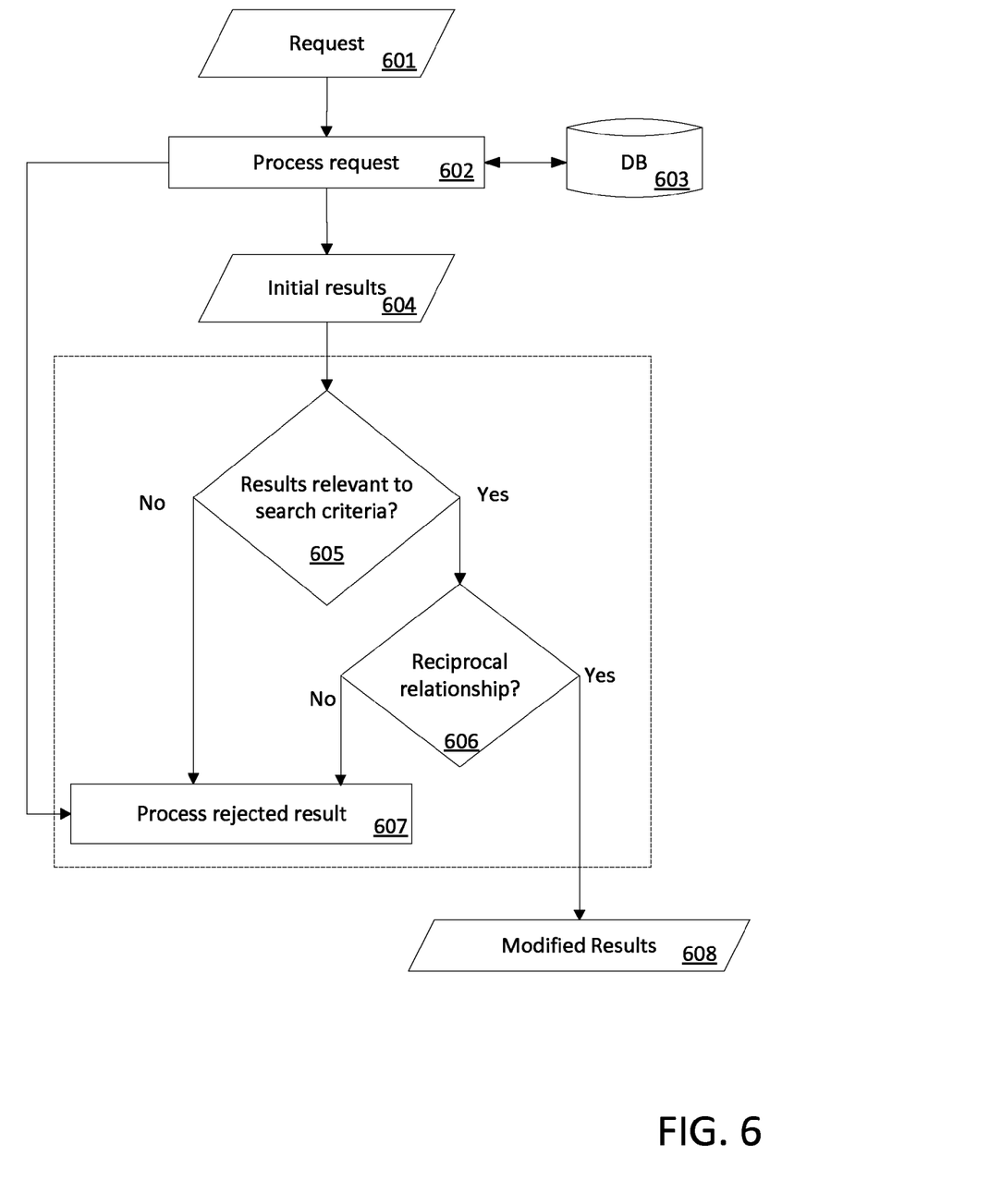
FIG. 6 is a high-level flow chart that illustrates some steps for a "reverse search" process, according to certain embodiments.

FIG. 6 is a high-level flow chart that illustrates some steps for the "reverse search" process, according to certain embodiments. At block 601 of FIG. 6, the user enters a user request. At block 602, the system processes the user request. According to certain embodiments, the processing of the user request may involve modifying or correcting the user request. The processing of the user request at block 602 includes using data from database 603 to produce initial results at block 604. At block 605, it is determined if the results are relevant to the search request of the user. In other words, do the results satisfy what the user is looking for? If at block 605, it is determined that the results are not satisfactory, then the results are rejected at block 607 and control returned to block 602 for reprocessing of the user request. If at block 605, it is determined that the results are satisfactory, then at block 606 the system performs a reverse search by checking for a reciprocal relationship criteria in the search results. For example, if the user is a 50 year man seeking blonde women, then the search results will include blonde women that are seeking 50 year old men. If the search results satisfy the reciprocal relationship criteria, then the results are presented to the user at block 608. If the search results do not satisfy the reciprocal relationship criteria then the results are rejected at block 607 and control returned to block 602 for reprocessing of the user request.

Figure 7:
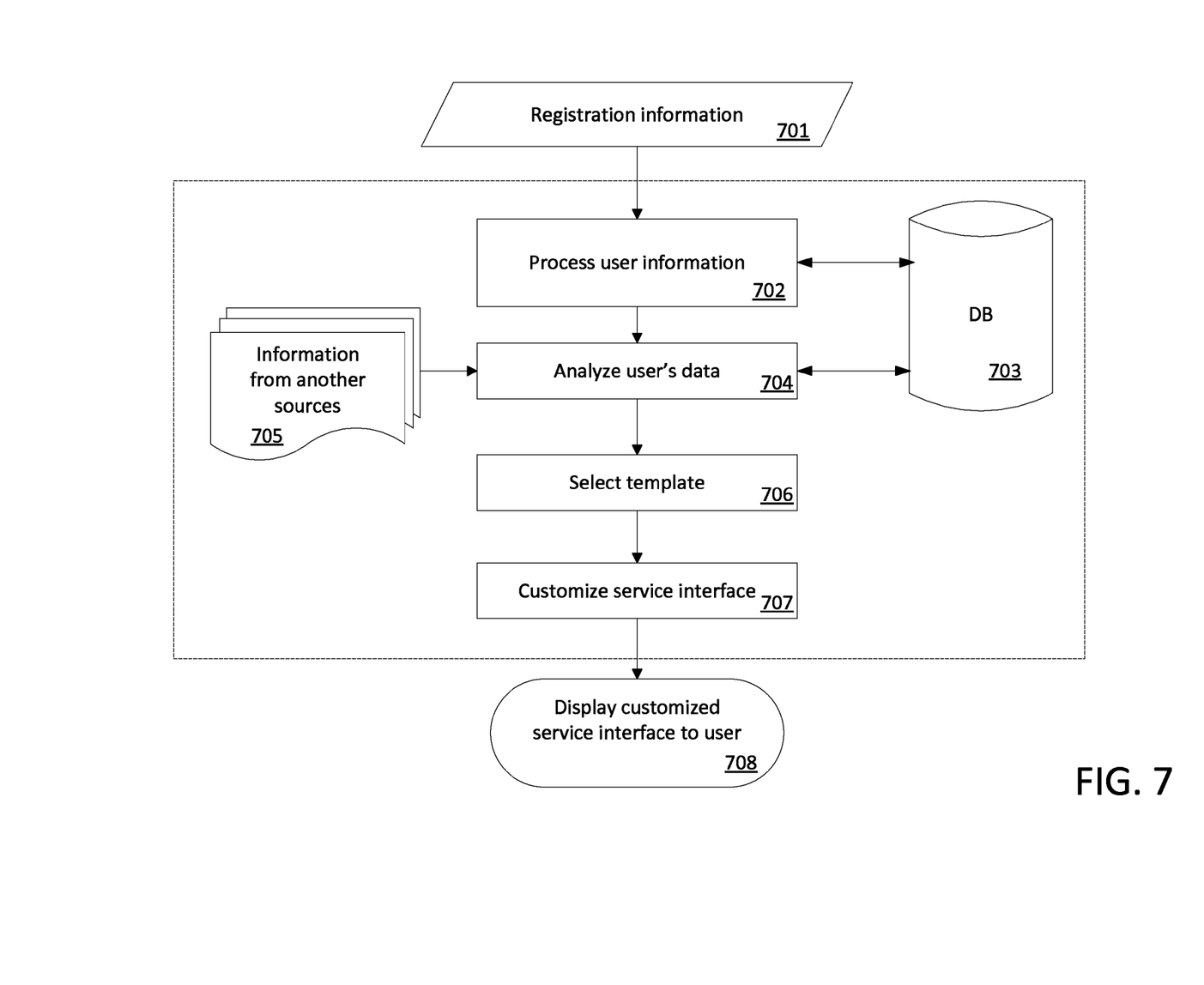
FIG. 7 is a high-level flow chart that illustrates some steps for customizing a service interface, according to certain embodiments.

FIG. 7 is a high-level flow chart that illustrates some steps for customizing a service interface, according to certain embodiments. According to certain embodiments, the system can customize the interface for a service to adapt to the user's preferences and needs. Information associated with the user is collected and analyzed in order to predict user behavior and to customize the service interface for the specific user that is using the service. At block 701, the user's registration information is collected and processed at block 702. If the registration is new, then the information is stored in the database 703. At block 704, the user's information is analyzed using information from various sources 705 and using any existing information on the user that is retrieved from the database 703. For example, user information including user preferences is analyzed. At block 706, the system uses the analyzed information to select a suitable template (or creating a new template) for customizing the service interface at block 707. At block 708, the customized service interface is displayed to the user.

According to certain embodiments, monetization of services can be realized through contextual advertising by placing advertisements of goods and services that relate to the user's preferences next to the search results that are presented to the user in response to the user's search request. Other monetization methods include placing paid advertisements at the top of the search results or in a prominent position that will be noticed by the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. A computer system comprising:
   at least one computer processing device comprising a user request modification module, a search results modification module, and a user request analytical module;
   a non-transitory computer-readable medium storing one or more modules, the one or more modules comprising instructions for execution by the at least one computer processing device to perform a method comprising:
      receiving, by the user request modification module, a first search request from a first user, the first search request including a first set of search criteria;
      initiating, by the user request modification module, a first database search using the first search request;
      obtaining, by the user request modification module, first search results based on the first search request;
      evaluating, by the search results modification module, the first search results according to search result parameters to determine whether to modify the first search results, wherein the search result parameters include at least an existence of the first search results, a volume of the first search results, and relevance of the first search results to the first search request;
      in response to a determination that the volume of the first search results is insufficient or the first search results are non-existent:
      enlarging the first search results by:
         automatically modifying, by the user request modification module, the first search request by relaxing the first set of search criteria to provide a modified search request, wherein the relaxing includes excluding one or more search criteria from the first set of search criteria provided by the first user;
         based on the modified search request and the first search results, obtaining, by the search results modification module, corrected first search results;
         performing, by the search results modification module, a reverse database search on the corrected first search results using a second set of search criteria to produce second search results, the second set of search criteria having a reciprocal relationship to the first set of search criteria, the second search results being a subset of the corrected first search results,
         ranking, by the search results modification module, the corrected first search results based on the second search results;
         comparing, by the user request analytical module, personal information associated with the first user with personal information obtained from one or more social media sites associated with the first user to determine relevant corrected first search results for the first user;
         predicting a behavior of the first user, the predicting including:
            based on the personal information associated with the first user and the personal information obtained from the one or more social media sites associated with the first user, determining a plurality of users having information that is similar to the personal information associated with the first user and the personal information obtained from the one or more social media sites associated with the first user;
            determining a behavior shown by the plurality of users;
            wherein the behavior of the first user is predicted based on the behavior shown by the plurality of users;
         generating, by the search results modification module, modified first search results based on the ranking the relevant corrected first search results, and the behavior predicted for the first user; and
         presenting, by the search results modification module, the modified first search results to the first user in an order of highest relevance to lowest relevance.

2. The computer system of claim 1, wherein the method further comprises modifying the first search request based on information associated with the first user.

3. The computer system of claim 1, wherein the method further comprises modifying the first search request based on parameters selected by the first user.

4. The computer system of claim 1, wherein the method further comprises modifying the first search request by comparing information associated with the first user with other information obtained from social media sites.

5. The computer system of claim 1, wherein the method further comprises customizing a service interface by predicting user behavior.

6. The computer system of claim 1, wherein the method further comprises using a template module for selecting or creating a template to customize a service interface for the first user.

* * * * *